US008783094B2

(12) United States Patent
Lutz et al.

(10) Patent No.: US 8,783,094 B2
(45) Date of Patent: Jul. 22, 2014

(54) ENVELOPE SEAL VERIFICATION SYSTEM AND METHOD

(75) Inventors: Raymond Mark Lutz, Mason, OH (US); Steven Carl Turner, Walton, KY (US)

(73) Assignee: FMR LLC, Boston, MA (US)

( * ) Notice: Subject to any disclaimer, the term of this patent is extended or adjusted under 35 U.S.C. 154(b) by 295 days.

(21) Appl. No.: 13/337,638

(22) Filed: Dec. 27, 2011

(65) Prior Publication Data

US 2013/0160526 A1 Jun. 27, 2013

(51) Int. Cl.
*G01M 3/04* (2006.01)

(52) U.S. Cl.
USPC .................. 73/49.8; 73/52; 73/865.8; 53/50; 53/53

(58) Field of Classification Search
USPC .......... 73/41, 45.3, 45.4, 49.2, 49.3, 40–49.8, 73/52, 865.8; 53/50, 53, 381.1–385.1
See application file for complete search history.

(56) References Cited

U.S. PATENT DOCUMENTS

| | | | | |
|---|---|---|---|---|
| 3,792,209 | A * | 2/1974 | Focke | 200/61.41 |
| 3,910,007 | A * | 10/1975 | Dorer | 53/58 |
| 3,935,800 | A * | 2/1976 | Sette et al. | 493/465 |
| 3,939,063 | A * | 2/1976 | Epperson et al. | 209/3.1 |
| 4,330,061 | A * | 5/1982 | Rudszinat et al. | 209/3.1 |
| 4,955,483 | A * | 9/1990 | O'Dea et al. | 209/548 |
| 5,052,168 | A | 10/1991 | DeWitt et al. | |
| 5,138,816 | A | 8/1992 | Holbrook et al. | |
| 5,729,954 | A * | 3/1998 | Lines et al. | 53/381.7 |
| 5,818,724 | A | 10/1998 | Brewster, Jr. et al. | |
| 5,971,385 | A | 10/1999 | Belec | |
| 6,530,192 | B2 | 3/2003 | Buckley et al. | |
| 6,860,090 | B2 | 3/2005 | Buckley et al. | |
| 7,272,916 | B2 * | 9/2007 | Webb | 53/53 |

* cited by examiner

*Primary Examiner* — Hezron E Williams
*Assistant Examiner* — Hoang Nguyen
(74) *Attorney, Agent, or Firm* — Proskauer Rose LLP

(57) ABSTRACT

An imperfection in a seal of an envelope can be identified. The envelope is moved laterally, and a positive flow of air is delivered to a leading edge of a top flap of the envelope to separate the top flap from a bottom flap or a side flap of the envelope at the imperfection in the seal of the envelope. Based on the separation of the top flap from the bottom flap or the side flap of the envelope, it can be determined whether the seal has the imperfection.

15 Claims, 5 Drawing Sheets

ENVELOPE SEAL VERIFICATION SYSTEM AND METHOD

FIELD OF THE INVENTION

The invention relates generally to verifying the integrity of envelope seals, and more particularly, to using a positive flow of air to identify an imperfection in a seal of an envelope.

BACKGROUND

Identify theft is a plague on society. Financial services companies, insurers, medical professionals and bulk mailers are concerned about the privacy of personal information of their customers, clients and patients. These vendors mail billions of pieces of mail on an annual basis. A risk exists that some pieces of mail will not be adequately sealed, thus exposing personal information to a third party.

SUMMARY OF THE INVENTION

The invention, in various embodiments, features a method and system for using a positive flow of air to identify an imperfection in a seal of an envelope. Imperfections can result from inadequate adhesive, inadequate positioning of the top flap on a side flap or bottom flap, or creasing of a flap of the envelope. The positive flow of air can separate or partially separate the top flap from the envelope. A wedge or ramp can be used to unfold the top flap along the crease line. In certain embodiments, the positive flow of air can open the flap 180 degrees along the crease line, and the wedge or ramp can be used to hold the envelope open.

The envelope can be removed from a stream of envelopes either manually or by mechanical means. The system can be implemented in mail processing apparatus. For example, the system can be used in a high speed inserter that processes about 22,000 pieces of mail per hour. An advantage of the technology is that it requires few, if any, moving parts that can foul the stream of envelopes and cause delays in the mail processing apparatus.

In one aspect, there is a method of identifying an imperfection in a seal of an envelope. The method includes moving the envelope laterally and delivering a positive flow of air to a leading edge of a top flap of the envelope to separate the top flap from a bottom flap or a side flap of the envelope at the imperfection in the seal of the envelope. It can be determined that the seal has the imperfection based on the separation of the top flap from the bottom flap or the side flap of the envelope.

In another aspect, there is an apparatus including a feed member having a surface to move a plurality of envelopes and a delivery system positioned relative to the feed member. The delivery system is configured to deliver a positive flow of air to a leading edge of a top flap of an envelope. The delivery system is adapted to identify an imperfection in a seal of the envelope by separating the top flap from a bottom flap or a side flap at the imperfection. A wedge is spaced from the feed member to unfold the top flap from the bottom flap or the side flap of the envelope.

In yet another aspect, there is an apparatus including a feed member having a surface to move a plurality of envelopes and a delivery system positioned relative to the feed member. The delivery system is configured to deliver a positive flow of air to a leading edge of a top flap of an envelope. The delivery system is adapted to identify an imperfection in a seal of the envelope by separating the top flap from a bottom flap or a side flap at the imperfection. The delivery system includes a source of compressed air, a housing defining a buffer volume in fluid communication with the source, at least one articulable segment connected to the housing, and a nozzle connected to the at least one articulable segment. The nozzle defines an orifice through which the flow of positive air is directed to the plurality of envelopes. The at least one articulable segment is configured to adjust angle of delivery of the flow of positive air relative to the feed member.

In still another aspect, there is an apparatus including a means for moving a plurality of envelopes laterally and a means for delivering a positive flow of air to leading edges of top flaps of the envelopes. The means for delivering is adapted to identify an imperfection in a seal of an envelope by separating a top flap from a bottom flap or a side flap of the envelope at the imperfection. The apparatus also includes a means for unfolding the top flap from the bottom flap or the side flap.

In other examples, any of the aspects above, or any apparatus, system or device, or method, process or technique, described herein, can include one or more of the following features. An envelope can be opened by inserting a wedge at the imperfection and unfolding the top flap from the bottom flap. The wedge can be disposed over and spaced from a feed member moving the envelope laterally. A plurality of envelopes can be received from an envelope inserter. The plurality of envelopes can move laterally on a feed member from the envelope inserter toward an envelope sorter. Prior to the envelope sorter, the positive flow of air can be delivered to the leading edge of the top flap of the envelope to identify the imperfection. The positive flow of air can be in an amount sufficient to cause separation but not remove the envelope from a feed member moving the envelope laterally.

In various embodiments, the positive flow of air can be delivered from a delivery system positioned relative to a feed member moving the envelope laterally. The delivery system can be configured to deliver the positive flow of air at an angle relative to the feed member to cause separation but not remove the envelope from the feed member.

In various embodiments, the positive flow of air can be delivered from a delivery system positioned relative to a feed member moving the envelope laterally. The delivery system can include a source of compressed air in fluid communication with a housing defining a buffer volume. At least one articulable segment can be connected to the housing. A nozzle can be connected to the at least one articulable segment. The nozzle can define an orifice through which the flow of positive air is directed to the envelope. The at least one articulable segment can be configured to adjust angle of delivery of the flow of positive air relative to the feed member. The nozzle of the delivery system can be positioned to deliver the positive flow of air at an angle downward toward the surface of the feed member. The angle can be about 75 degrees.

In certain embodiments, the apparatus is disposed between an envelope inserter and an envelope sorter. The feed member can be configured to move the plurality of envelopes from the envelope inserter to the envelope sorter. In some embodiments, the apparatus is a portion of an envelope inserter.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figures 1A, 1B, 1C, 1D:
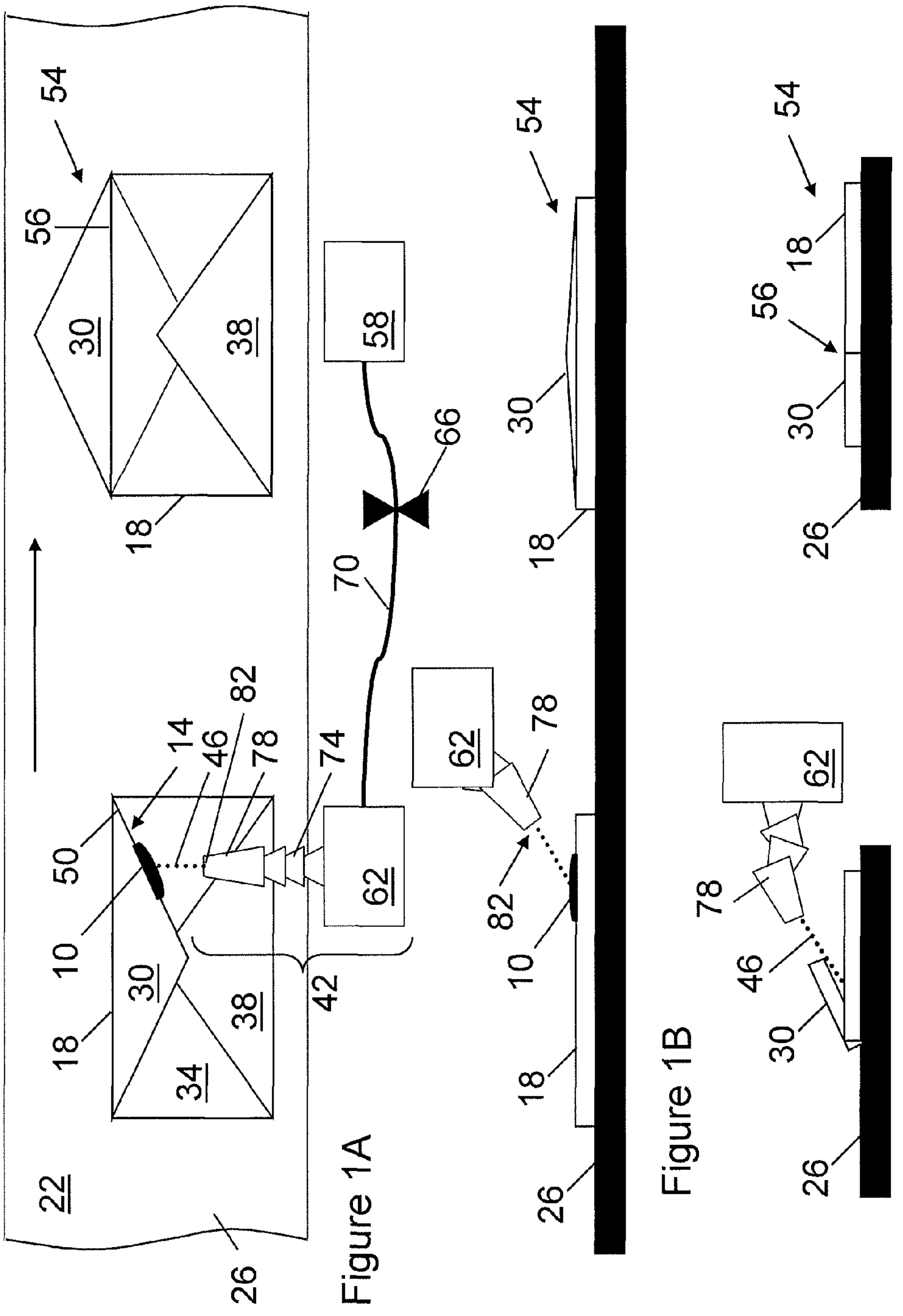
FIGS. 1A-1D show various views of an apparatus including a positive flow of air for identifying an imperfection in a seal of an envelope.

FIG. 1A shows an apparatus for identifying an imperfection 10 in a seal 14 of an envelope 18. The apparatus includes a feed member 22 having a surface 26 to move envelopes 18 laterally. Each envelope 18 includes a top flap 30, side flaps 34 and a bottom flap 38. A delivery system 42 is positioned relative to the feed member 22. The delivery system 42 is configured to deliver a positive flow of air 46 to a leading edge 50 of the top flap 30 of at least one of the envelopes 18. The delivery system 42 is adapted to identify the imperfection 10 in a seal 14 of an envelope 18 by separating the top flap 30 from a side flap 34 or the bottom flap 38 of the envelope 18 at the imperfection 10. The delivery system 42 can deliver sufficient positive air flow 46 to partially separate the top flap 30 from the envelope 18, or to completely separate the top flap 30 from the envelope 18 so the top flap 30 is unfolded into an unfolded position 54 along the crease line 56.

FIG. 1B shows a view of the apparatus across the surface 26 of the feed member 22. FIG. 1C shows a view of the apparatus along the surface 26 of the feed member 22 where the delivery system 42 delivers the positive flow of air 46 to the leading edge 50 of the top flap 30 of the envelopes 18. FIG. 1D shows a view of the apparatus along the surface 26 of the feed member 22 after the top flap has been separated ands in the unfolded position 54. The feed member 22 can be a transport mechanism, such as a conveyor belt or rollers.

As illustrated in FIG. 1A, the delivery system 42 includes a source 58 of compressed air in fluid communication with a buffer volume 62. For example, the buffer volume 62 can be connected to the source 58 via a valve 66 that controls the air flow and via tubing 70. At least one articulable segment 74 is connected to the buffer volume 62. A nozzle 78 is connected to an articulable segment. In certain embodiments, the nozzle 78 is the last articulable segment 74. The nozzle 78 can define an orifice 82 through which the flow of positive air 46 is directed to the envelope 18. The articulable segment(s) 74 can be configured to adjust the angle of delivery of the flow of positive air 46 relative to the feed member 22. The articulable segments 74 can interlock and be oriented at any angle relative to the adjacent segment. In some embodiments, tubing can be used in place of the articulable segments 74. The housing defining the buffer volume 62 and the articulable segments 74 can be formed from plastic.

In various embodiments, the seal of the envelope 18 is between the top flap 30 and the bottom flap 38 only. The bottom flap 38 can be square and extend along the entire width of the envelope, instead of being triangular, as shown in the figures.

In various embodiments, the valve 66 is used to set the pressure of the air flow emitted through the orifice 84 of the nozzle 78. The pressure can be up to 80 psi. In some embodiments, the pressure is about 40 to 50 psi. The pressure can be about 3-10 psi. For example, the pressure can be about 5 psi. In various embodiments, the pressure is sufficient to at least partially separate the top flap 30 from the envelope 18 at the imperfection 10. In some embodiments, the pressure is sufficient to unfold the top flap 30 along the crease line 56.

The flow of air can be continuous or intermittent. For example, a sensor can detect the presence of an envelope 18 and actuate the valve 66 to generate a short burst of air.

The orifice 84 of the nozzle 78 can be about a sixteenth of an inch to half an inch, although larger or smaller orifices can be used. In certain embodiments, the orifice is about an eighth of an inch to about one quarter of an inch. The orifice can be circular, elliptical or polygonal in cross-section.

The angle of delivery of the flow of positive air 46 relative to the feed member 22 can be at any angle from 0 degrees (e.g., parallel to the surface of the feed member) to 90 degrees (e.g., orthogonal to the feed member 22). The angle can be downward toward the surface 26 of the feed member 22. In certain embodiments, the flow of positive air 46 is substantially parallel to the surface of the feed member 22. In certain embodiments, the angle is about 60 degrees to about 80 degrees (e.g., about 75 degrees). The angle can be sufficient to cause separation of the seal 14 at the imperfection 10 while precluding the envelope 18 from blowing off of the surface 26 of the feed member 22.

Figures 2A, 2B:
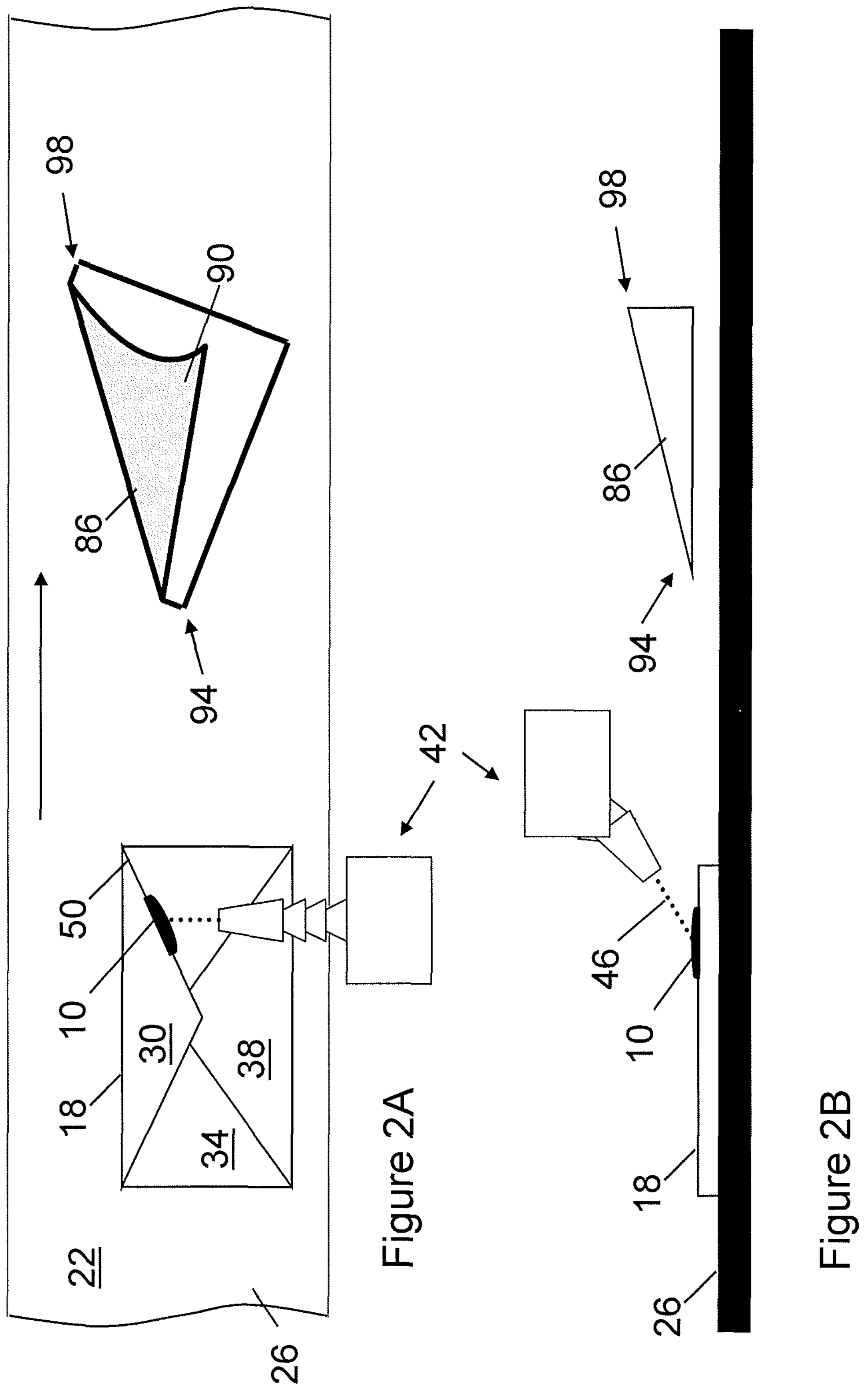
FIGS. 2A-2F show various views of an apparatus including a positive flow of air and a wedge for identifying an imperfection in a seal of an envelope.

FIGS. 2A-2F show an apparatus for identifying an imperfection 10 in a seal 14 of an envelope 18. The apparatus includes a wedge 86 capable of unfolding the top flap 30 from the side flaps 34 and the bottom flap 38 along the crease line 56 and/or holding the top flap 30 open. As shown in FIGS. 2A and 2B, the wedge 86 is spaced from the delivery system 42 along the feed member 22.

The distance between the wedge 86 and the feed member 22 can be on the order of inches or feet, depending on the application. In certain embodiments, the distance is about 10 to 15 inches (e.g., about 13 inches). The wedge 86 can be positioned proximate to the feed member 22 so that the margin allows for an envelope 18 to pass under with an adequate seal but for the seal to be caught by the wedge 86 if it is imperfect. The distance can be about 0.005 inch to about 1 inch.

The wedge 86 can be a stripper blade, an airfoil or a ramp. The wedge 86 can be formed from stainless steel, aluminum, molded plastic or another manufacturable material. The wedge 86 can be formed by folding a corner 90 of a square or rectangular workpiece over to form a wedge that increases in height and thickness along the direction of travel of the feed member 22.

The wedge 86 can be thinner at leading edge 94 and thicker at a trailing edge 98 (e.g., a reverse taper). The wedge 86 can increase in height in the direction of travel along the feed member 22. The wedge 86 can increase in width across direction of travel so that, relative to the envelope 18 on the feed member 22, the leading edge 94 of the wedge 86 is below the crease line 56 and the trailing edge 98 is above the crease line 56.

Figures 2C, 2D:
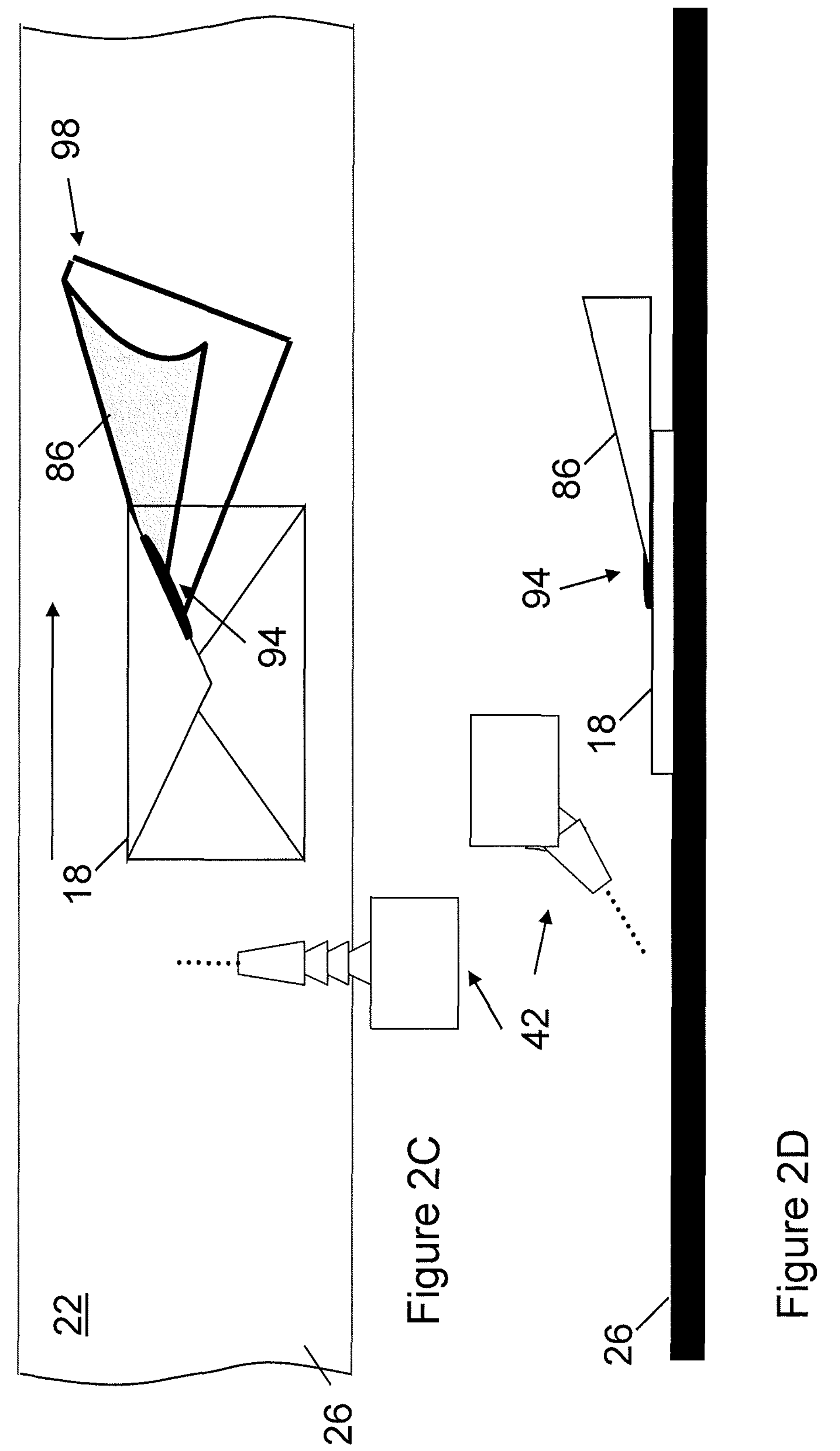

FIGS. 2C and 2D show the envelope 18 advancing past the delivery system 42 and engaging the wedge 86. The leading edge 94 pierces the imperfection 10 of the seal 14. As the envelope 18 advances and the wedge 86 increases in height, the top flap 30 is increasingly separated from the side flaps 34 and bottom flap 38.

Figure 2E:
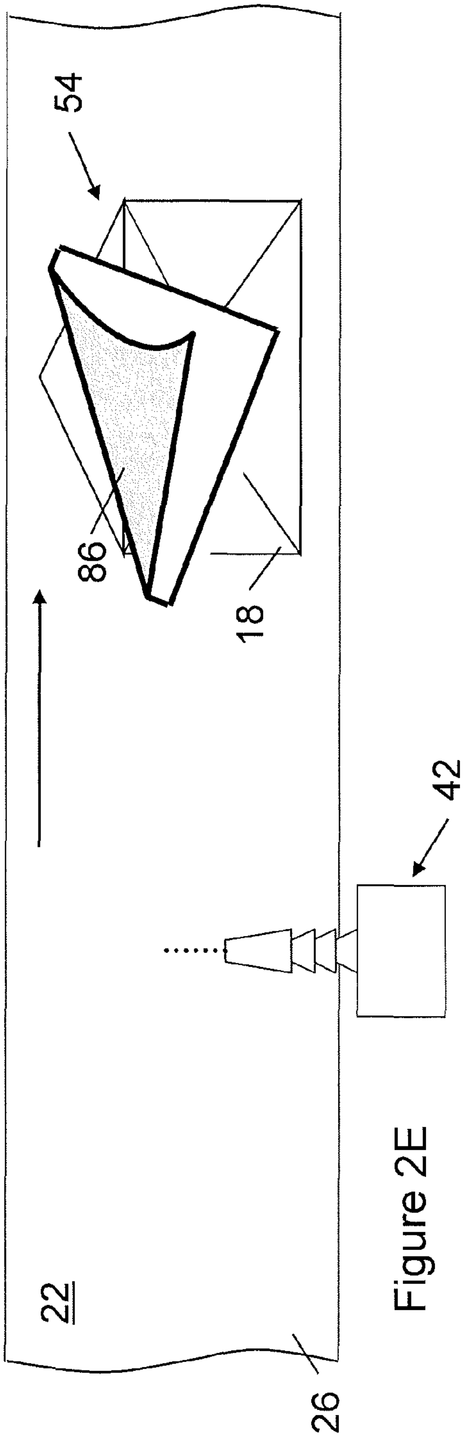
Figure 2F:
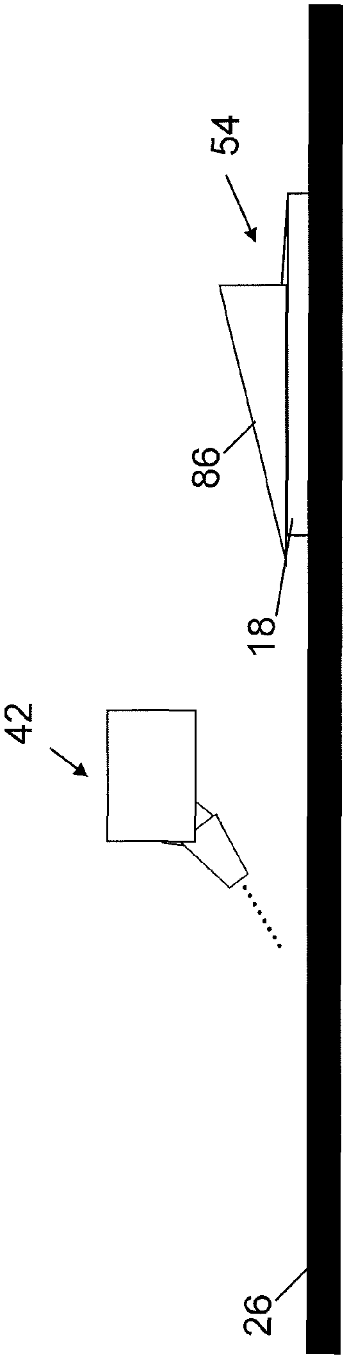

FIGS. 2E and 2F show the envelope 18 with the top flap 30 unfolded and held open 54. The wedge 86 can ensure that the envelope 18 does not jam the flow of envelopes by being in a partially opened state.

The positive flow of air 46 and/or the wedge 86 can be used to identify an envelope 18 having an imperfection in the seal. Identification can include opening or at least partially opening a seal at an imperfection. A sensor can be used to determine that an envelope 18 is at least partially open, so that the envelope 18 can be removed prior to sorting and sending. In some embodiments, a person can determine that an envelope 18 is at least partially open, and can remove the envelope 18 from the feed member 22.

Figure 3:
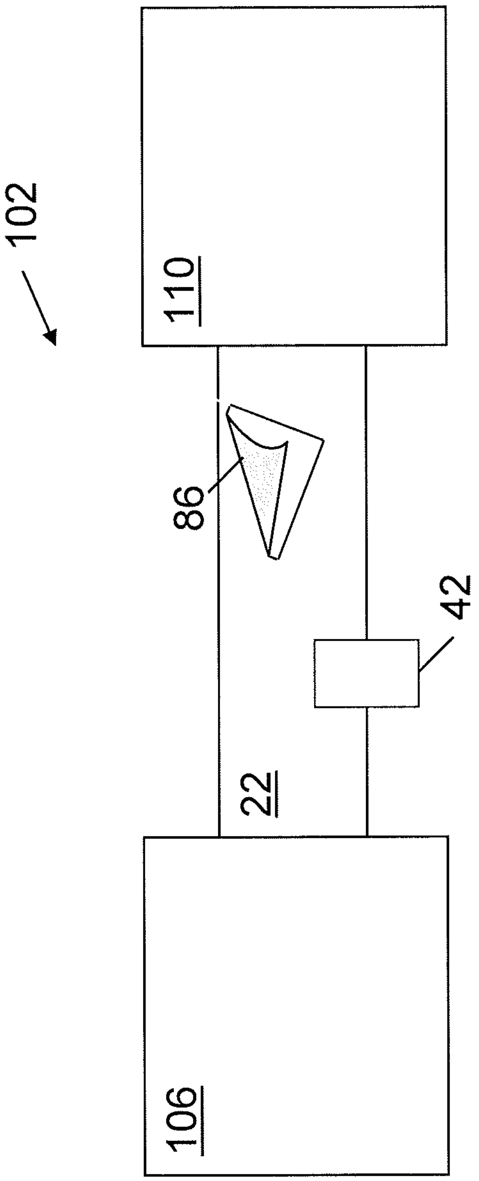
FIG. 3 shows an exemplary mail processing apparatus using the technology of the invention.

FIG. 3 shows an exemplary mail processing apparatus 102 using the technology of the invention. The apparatus 102 can include an envelope inserter 106 and an envelope sorter 110. The feed member 22 can connect, and can be configured to move a plurality of envelopes between, the envelope inserter 106 and the envelope sorter 110. The delivery system 42 and/or the wedge 86 can be disposed between the envelope inserter 106 and the envelope sorter 110. In some embodiments, the delivery system 42 and/or the wedge 86 can be a portion of either the envelope inserter 106 or the envelope sorter 110.

The envelope inserter 106 can receive envelopes and inserts from separate feed mechanisms, can insert the inserts into the envelopes, and can seal the top flap of the envelope to the bottom flap and/or side flaps of the envelope. In some instances, the seal can include an imperfection, which can be identified by the delivery system 42 and/or the wedge 86. An envelope with an imperfect seal can be removed from the feed member 22 prior to being received by the envelope sorter 110. In some embodiments, the envelope sorter 110 includes a mechanism to remove the envelope from the train of envelopes.

The mail processing apparatus 102 can be a high speed system that can process about 22,000 pieces per hour, although the technology can be implemented in faster or slower systems.

While the invention has been particularly shown and described with reference to specific illustrative embodiments, it should be understood that various changes in form and detail may be made without departing from the spirit and scope of the invention.

What is claimed is:

1. A method of identifying an imperfection in a seal of a sealed mail envelope, comprising:

moving a sealed mail envelope laterally on a surface of a feed member relative to an air delivery system, the sealed mail envelope having a seal positioned between a top flap and a bottom flap or side flap of the envelope;

delivering a positive flow of air from the air delivery system to a leading edge of the top flap of the envelope at a pressure and angle to at least partially separate the top flap from the bottom flap or the side flap of the envelope at an imperfection in the seal without removing the envelope from the feed member;

further moving the envelope on the surface of the feed member under a stationary wedge, the wedge being spaced above the feed member such that sealed mail envelopes having imperfect seals engage the wedge and sealed mail envelopes having adequate seals only pass under the wedge; and as the envelope advances past the wedge, engaging the partially separated top flap with the wedge and unfolding the top flap of envelope to a substantially 180 degree position relative to a sealed position of the top flap, the wedge having a shape that increases in height and width with a direction of travel of the feed member for unfolding the top flap from the envelope.

2. The method of claim 1 further comprising:

receiving a plurality of envelopes from an envelope inserter, the envelope being one of the plurality of envelopes;

moving the plurality of envelopes laterally on the surface of the feed member from the envelope inserter toward an envelope sorter; and prior to the envelope sorter, delivering the positive flow of air to the leading edge of the top flap of the envelope to identify the imperfection.

3. The method of claim 1 wherein the delivery system including a source of compressed air in fluid communication with a housing defining a buffer volume, at least one articulable segment connected to the housing, and a nozzle connected to the at least one articulable segment, the nozzle defining an orifice through which the flow of positive air is directed to the envelope, the at least one articulable segment configured to adjust the angle of delivery of the flow of positive air relative to the feed member.

4. An apparatus for identifying an imperfection in a seal of a sealed mail envelope comprising:

a feed member having a surface to move a plurality of sealed mail envelopes, each sealed mail envelope having a seal positioned between a top flap and a bottom flap or side flap of the envelope;

an air delivery system positioned relative to the feed member, the delivery system configured to deliver a positive flow of air to a leading edge of the top flap of an envelope at a pressure and angle to at least partially separate the top flap from the bottom flap or the side flap of the envelope at an imperfection in the seal without removing the envelope from the feed member; and a stationary wedge positioned downstream from the air delivery system and spaced above the feed member such that sealed mail envelopes having imperfect seals engage the wedge and sealed mail envelopes having adequate seals only pass under the wedge;

wherein as the envelope advances past the wedge, the wedge engages the partially separated top flap and unfolds the top flap of envelope to a substantially 180 degree position relative to a sealed position of the top flap, the wedge having a shape that increases in height and width with a direction of travel of the feed member for unfolding the top flap from the envelope.

5. The apparatus of claim 4 wherein the delivery system includes:

a source of compressed air;

a housing defining a buffer volume in fluid communication with the source;

at least one articulable segment connected to the housing; and a nozzle connected to the at least one articulable segment, the nozzle defining an orifice through which the flow of positive air is directed to the plurality of envelope, the at least one articulable segment configured to adjust angle of delivery of the flow of positive air relative to the feed member.

6. The apparatus of claim 4 wherein the apparatus is disposed between an envelope inserter and an envelope sorter.

7. The apparatus of claim 6 wherein the feed member is configured to move the plurality of envelopes from the envelope inserter to the envelope sorter.

8. The apparatus of claim 4 wherein a nozzle of the delivery system is positioned to deliver the positive flow of air at an angle downward toward the surface of the feed member.

9. The apparatus of claim 5 wherein the angle of delivery is downward toward the surface of the feed member.

10. The apparatus of claim 4 wherein a plane of the positive flow of air and the feed member form an angle of about 75 degrees.

11. An apparatus for identifying an imperfection in a seal of a sealed mail envelope comprising:

a feed member having a surface to move a plurality of sealed mail envelopes, each sealed mail envelope having a seal positioned between a top flap and a bottom flap or side flap of the envelope; and an air delivery system positioned relative to the feed member, the delivery system configured to deliver a positive flow of air to leading edges of top flaps of the envelopes at a pressure and angle to at least partially separate the top flap from the bottom flap or the side flap of the envelope at an imperfection in the seal without removing the envelope from the feed member;

a stationary wedge positioned downstream from the air delivery system and spaced above the feed member such that sealed mail envelopes having imperfect seals engage the wedge and sealed mail envelopes having adequate seals only pass under the wedge;

wherein as the envelope advances past the wedge, the wedge engages the partially separated top flap and unfolds the top flap of envelope to a substantially 180 degree position relative to a sealed position of the top flap, the wedge having a shape that increases in height and width with a direction of travel of the feed member for unfolding the top flap from the envelope;

the delivery system further comprising:

a source of compressed air;

a housing defining a buffer volume in fluid communication with the source;

at least one articulable segment connected to the housing; and a nozzle connected to the at least one articulable segment, the nozzle defining an orifice through which the flow of positive air is directed to the plurality of envelopes, the at least one articulable segment configured to adjust angle of delivery of the flow of positive air relative to the feed member.

12. The apparatus of claim 4 wherein the pressure for delivering the positive flow of air from the air delivery system is between 40 to 50 psi.

13. The apparatus of claim 4 wherein the pressure for delivering the positive flow of air from the air delivery system is between 3 to 10 psi.

14. The apparatus of claim 4 wherein the pressure for delivering the positive flow of air from the air delivery system is between 3 to 80 psi.

15. The apparatus of claim 4 wherein a plane of the positive flow of air and the feed member form an angle is between 60 and 80 degrees.

* * * * *